US011901753B2

(12) United States Patent
Cervinka

(10) Patent No.: US 11,901,753 B2
(45) Date of Patent: Feb. 13, 2024

(54) SAFETY DEVICE AND METHOD TO PREVENT USE OF THE SAME DEVICE IF FAULTY

(71) Applicant: NEWTRAX HOLDINGS INC., Montreal (CA)

(72) Inventor: Alexandre Cervinka, Montreal (CA)

(73) Assignee: Newtrax Holdings Inc., Montreal (CA)

( * ) Notice: Subject to any disclaimer, the term of this patent is extended or adjusted under 35 U.S.C. 154(b) by 0 days.

(21) Appl. No.: 18/079,988

(22) Filed: Dec. 13, 2022

(65) Prior Publication Data

US 2023/0155402 A1    May 18, 2023

Related U.S. Application Data

(63) Continuation of application No. 16/467,420, filed as application No. PCT/CA2017/051479 on Dec. 6, 2017, now Pat. No. 11,557,905.

(51) Int. Cl.
| | |
|---|---|
| *H02J 7/00* | (2006.01) |
| *H04B 17/318* | (2015.01) |
| *A42B 3/04* | (2006.01) |
| *G05B 23/02* | (2006.01) |
| *G06K 19/07* | (2006.01) |
| *G06K 19/077* | (2006.01) |
| *H04W 4/80* | (2018.01) |

(52) U.S. Cl.
CPC ............ *H02J 7/0036* (2013.01); *A42B 3/044* (2013.01); *G05B 23/0216* (2013.01); *G06K 19/0723* (2013.01); *G06K 19/07758* (2013.01); *H04B 17/318* (2015.01); *H04W 4/80* (2018.02)

(58) Field of Classification Search
CPC ...... H02J 7/0036; H04B 17/318; A42B 3/044; G05B 23/0216; G06K 19/0723; G06K 19/07758; H04W 4/80
See application file for complete search history.

(56) References Cited

U.S. PATENT DOCUMENTS

| | | | |
|---|---|---|---|
| 2005/0174753 A1* | 8/2005 | Cao ..................... | A42B 3/044 362/802 |
| 2015/0046175 A1* | 2/2015 | Jorgenson ............ | A61N 1/3925 705/2 |

* cited by examiner

*Primary Examiner* — Laura A Gudorf
(74) *Attorney, Agent, or Firm* — Corinne R. Gorski

(57) ABSTRACT

The present invention discloses a safety device adapted to prevent workers from going into hazardous environment, such as underground using the faulty safety device. As a safety device, typically embodied as a cap lamp, must be charged prior to each use, the device is adapted to detect when the device is removed from the charger. The device starts to blink continuously when disconnected from the charger. An automated test procedure is completed on the device. The user may also complete a manual portion of the test procedure to make the device usable. When the test procedure is completed successfully, the lamp stops blinking. If the test procedure is not successful, the lamp continues blinking to effectively prevent user from using a faulty device.

20 Claims, 10 Drawing Sheets

SAFETY DEVICE AND METHOD TO PREVENT USE OF THE SAME DEVICE IF FAULTY

CROSS-REFERENCE TO RELATED APPLICATIONS

The present patent application is a continuation application of U.S. patent application Ser. No. 16/467,420; entitled "SAFETY DEVICE AND METHOD TO PREVENT USE OF THE SAME DEVICE IF FAULTY"; and filed at the United States Patent and Trademark Office on Jun. 6, 2019; which is a National Stage Entry of International Patent Application No. PCT/CA2017/051479; entitled "SAFETY DEVICE AND METHOD TO PREVENT USE OF THE SAME DEVICE IF FAULTY"; and filed at the World Intellectual Property Organization on Dec. 6, 2017; which claims the priority of U.S. Provisional Patent Application No. 62/430,869; entitled "SAFETY DEVICE AND METHOD TO PREVENT USE OF THE SAME DEVICE IF FAULTY"; and filed at the United States Patent and Trademark Office on Dec. 6, 2016. The content of all previous applications in incorporated herein by reference.

TECHNICAL FIELD

The present invention generally relates to safety devices and methods allowing detection of faulty devices. More particularly, the present invention relates to personal safety devices and methods to prevent the use of faulty safety devices

BACKGROUND

Numerous underground mines are in operation throughout the world. In these harsh, remote and confined environments there are significant risks of injuries or fatalities caused by workplace hazards such as fires, rock falls, gas intoxications, heat strokes, and collisions with machines etc.—and these risks are compounded by delays for rescue and treatment, if an accident happens.

To mitigate these risks, safety devices are increasingly given to workers to provide them with a variety of safety features such as notification of evacuation, tracking of location, proximity warning, man down detection, etc. These systems come in various configurations and use various technologies, all with their inherent advantages and drawbacks.

However, even if these types of safety devices and systems can provide valuable warnings to enhance safety at mine sites, it remains that these systems rely on workers going underground with a functional device. For example, if a worker goes underground with a safety device that has a broken antenna, the proximity warning signal the safety device normally transmits won't work properly, therefore this worker will be invisible in the blind spots of machinery operators.

Despite well-documented test procedures to confirm the personal safety device is functional, a small percentage of workers still don't seem to care if the device works or not—and knowingly or unknowingly go underground with a faulty device. One reason for this can be that some workers don't like their whereabouts to be tracked.

Hence, in view of the foregoing, there is a need for an improved safety device and methods to detect faulty devices and preferably force a user to select a working one.

SUMMARY

The shortcomings of the prior art are generally mitigated by providing a safety device configured to prevent use of the said safety device if faulty or at least alert a user of a faulty device.

In one aspect of the present invention, a safety device is configured to prevent use of the said safety device if faulty. The safety device typically comprises a portable power source, a charging interface, a mean for remote identification, such as an RFID tag, a mean for communicating via a wireless network, an input user-interface, an output user-interface and a processor configured to:
- execute an automated test procedure on the device while the device is connected to the charger;
- execute a manual test procedure on the device, including via input user-interface;
- if all test procedures are successful, enable the output user interface;

In some aspects of the invention, the safety device represents an integral part of the user's everyday work.

In one aspect of the present invention, a safety device configured to prevent use of the said safety device if faulty is provided. The safety device typically comprises a portable power source, a charging interface, a mean for remote identification, such as a RFID tag, a mean for communicating via a wireless network, an input user-interface, an output user-interface and a processor configured to:
- detect if the charging interface is connected to a charger;
- when charging interface changes state from connected to disconnected, disable the output user-interface;
- execute an automated test procedure on the device;
- execute a manual test procedure on the device, including via input user-interface;
- if all test procedures are successful, re-enable the output user interface;

In a further aspect of the present invention, a method to prevent use of a faulty safety device is provided. The method comprises:
- executing an automated test procedure on the safety device being connected to a charger;
- executing a manual test procedure on the device, including via an input user-interface of the safety device;
- enabling the output user-interface when all tests of the test procedure succeed.

In another aspect of the present invention, a method to prevent use of a faulty safety device is provided. The method comprises:
- detecting if the safety device is connected to a charger;
- disabling an output user-interface of the safety device when charging status changes from charging to discharging;
- executing an automated test procedure on the safety device;
- executing a manual test procedure on the device, including via an input user-interface of the safety device;
- enabling the output user-interface when all tests of the test procedure succeed.

In a yet another aspect of the invention, a safety device configured to prevent use of the said safety device if faulty is provided. The safety device comprises a portable power source and a charging interface, the charging interface adapted to supply power to the portable power source from a charger. The safety device further comprises a mean for communicating with a wireless network and an input user-interface connected to a processor, an output user-interface connected to the processor. The processor is configured to execute an automated test procedure on the safety device while the safety device is being charged by the charger, to identify a manual test procedure on the device and if the automated and manual test procedures are successful, to enable the output user interface. The processor may be further configured to detect the charging interface connection state, the states being charging or not charging and when the state of the charging interface changes from charging to not charging, to disable the output user-interface.

The automated and manual test procedures to be executed on the safety device may comprise any test to assert the status of the safety device and may comprise any test to ensure that the safety device is in working conditions.

The safety device may further comprise an inertial sensor. The automated test procedure may then detect that no movement occurs when the safety device is charging and/or may detect movement during a predetermined duration after the safety device is not charging.

The safety device may further comprise an inertial sensor. The automated test procedure may than detect an ambient infrared signal when the safety device is charging.

The automated test procedure may further comprise the mean for communicating via a wireless network to connect to a wireless access point available within a predetermined area. The automated test procedure may test that the strength of the received signal is higher than a predetermined level and or may further comprise to connect to each one of the wireless networks.

The input user-interface may comprise controls. The manual test procedure may detect if the user has pressed and/or activated the controls and/or may detect if the user activated a predetermined sequence of controls.

The safety device may further comprise a mean for remote identification. The mean for remote identification may comprise a unique device identification (device ID) number associated with the safety device and a user unique identification number (user ID) associated with a user. The manual test procedure may comprise communicating with a register to confirm that the device ID is associated with the user ID when the user activates the input user-interface. The user input-interface may be configured to input the user ID and/or may further comprise a scanning device configured to scan the user ID.

The automatic test procedure may further comprise checking the current charge level of the portable power source and comparing the current charge level with a predetermined minimum charge level.

The safety device may be integrated into a cap lamp. The cap lamp may be configured to continuously flash or blink when the safety device is not charging and to stop flashing or blinking when the manual and automated test procedure are successful. The safety device may also comprise a memory unit adapted to store the failure of the one or more automated test procedures.

In another aspect of the invention, a method to prevent use of a faulty safety device is provided. The method comprises a processor of the safety device executing an automated test procedure on the safety device being charged, executing a manual test procedure on the safety device and enabling an output user-interface when all tests of the test procedure succeed. The method may further comprise detecting if the safety device charging using the charger and disabling an output user-interface of the safety device when charging status changes from charging to discharging.

The manual test procedure may be executed based on commands received on an input user-interface of the safety device. The execution of the automated test procedure may also be triggered by the safety device is charging. The automated test procedure may be executed at a predetermined frequency.

The automated test procedure may further comprise testing if movement of the safety device is detected, testing if the safety device connects to access point of a wireless network, testing if an infrared sensor of the safety device detects an incoming infrared signal and/or testing if battery charge level is higher than a predetermined level.

The manual test procedure may comprise testing if all the buttons of the safety device have been pressed and/or testing if the user identification is associated with the device identification.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION

A novel safety device and method to prevent use of the same safety device if faulty will be described hereinafter. Although the invention is described in terms of specific illustrative embodiments, it is to be understood that the embodiments described herein are by way of example only and that the scope of the invention is not intended to be limited thereby.

Figure 1A:
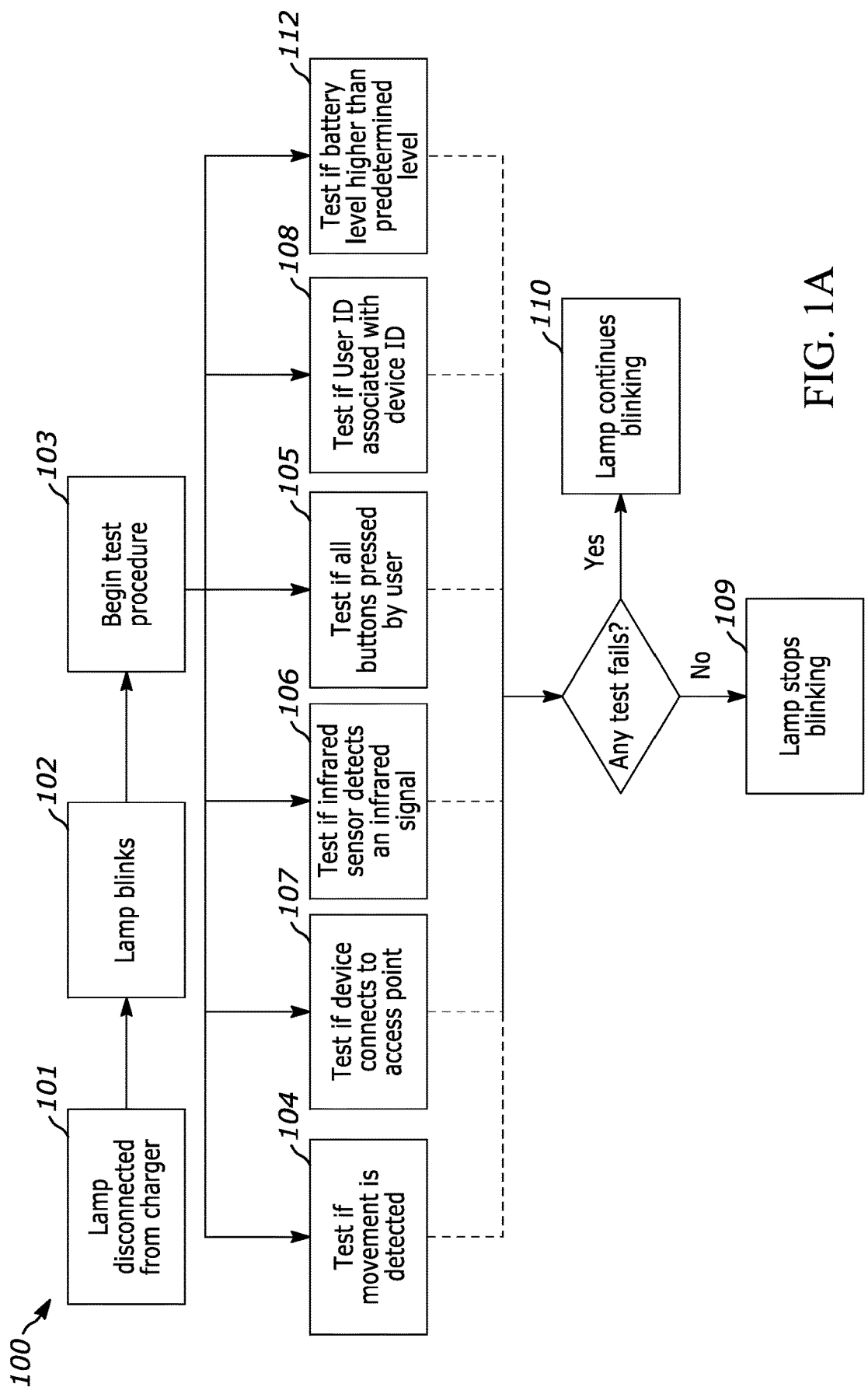
FIG. 1A is a workflow diagram of a method to prevent use of faulty exemplary safety device integrated into a cap lamp when the safety device is disconnected from a charging device in accordance with the present invention.

Now referring to FIG. 1A, a method to prevent use of faulty exemplary safety device integrated into a cap lamp is shown. Even if the safety device is embodied as being integrated into a cap lamp, one skilled in the art shall understand that the present method may be adapted to any other types of safety device comprising a portable power source, a charging interface, a mean for communicating via a network, an input user-interface, an output user-interface and a processor without departing from the principles of the present invention.

The method comprises the steps to detect that the safety device is removed or disconnected from a charger 101, to use an output user-interface of the safety device to output a signal when the safety device is disconnected from the charger 102, to execute an automated and/or a manual test procedure on the safety device 103, the manual test procedure being executed based on commands received on an input user-interface of the safety device; stopping the output of the signal if test procedure succeeds 109. In the event where any one of the tests comprised in the test procedure fails, the method further comprises the step of continuing the output of the same signal or of a different signal when the safety device 110.

Understandably, in other embodiments other means of charging may be used. In one embodiment, inductive charging may used. As inductive charger does not require a physical connection, the method may comprise detecting that the safety device is not charging or that the safety device is not coupled to the inductive charger.

In a preferred embodiment, the safety device is integrated in a cap lamp. In such an embodiment, the safety device is typically configured to communicate evacuation notification by flashing a light of the cap lamp or using any other means; to allow use of a control, such as emergency buttons, to request help or call for help; to request a stop from all vehicles in range triggered by a control, such as emergency buttons, to automatically detect a man down situation, such situation triggering a signal, such as an alarm, if the cap lamp light is ON and no movement is detected by an embedded inertial sensor for a pre-determined period of time; to communicate proximity warnings to heavy equipment operators in range as such heavy equipment operators may not see pedestrians in their blind spots; to filter proximity warning nuisance alarms when pedestrians are in a safe zone, as defined by the presence of an encoded infrared light confined by opaque materials; and/or to track location of the user of the safety device.

In the preferred embodiment, the automated and/or manual test procedure on the safety device may comprise any test to assert the status of the safety device or ensure that the safety device is in working conditions.

Still referring to FIG. 1A, in one of the embodiments, the safety device may comprise an inertial sensor. In such an embodiment, the test procedure may comprise detecting no movement when the safety device is connected to the charger and detecting movement during a predetermined delay after the safety device is disconnected from the charger 104. As such, if no movement is detected after the safety device is disconnected from the charger, the test procedure fails 110.

Still referring to FIG. 1A, in one of the embodiments, the safety device may comprise an infrared sensor. In such an embodiment, the test procedure may comprise detecting an ambient infrared signal when the safety device is connected to the charger. As such, if no infrared signal was detected while the safety device was in the charger, the test procedure fails 110.

Still referring to FIG. 1A, in one of the embodiments, the mean for communicating via a network may be adapted to communicate with a wireless network such as Wi-Fi or mobile network. The test procedure may further comprise wirelessly connecting to a wireless access point available within a predetermined zone 107, such as the charging area. Alternatively, if the safety device relies on a receiver only, the test may simply comprise testing that the strength of the received signal is higher than a predetermined level. As such, if the device does not connect with a wireless access point or if the signal strength is below the predetermined level, the test procedure fails 110.

In other embodiments, the safety device may comprise more than one mean for communicating with a wireless network, such as modems, radios or antennas. Without being limited to the following list, the safety device may comprise more than one of different types of radios, such as VHF or UHF for evacuation signalling, UHF for proximity warning, UHF for network connectivity, WiFi, Bluetooth and/or UWB, Chirp. In such embodiments, the test procedure may further comprise wirelessly connecting to each wireless access point associated with each mean of communication comprised in the safety device. Alternatively, if the safety device relies on a plurality of receivers, the test may simply comprise testing that the strength of the received signal is higher than a predetermined level for each receiver.

Still referring to FIG. 1A, in one of the embodiments, the input user-interface may be controls such as buttons. The test procedure may further comprise detecting if the user has pressed and/or activated the controls. The safety device is configured to detect the activation of all controls or of a predetermined sequence of activation of controls 105. When such a test is successful 109, it typically confirms that the electronics related to the controls is working properly. As such, if any of the controls is not detected, the test procedure fails 110.

Still referring to FIG. 1A, in one of the embodiments, the safety device is associated with a unique device identification number and the user is associated with a user identification number. The test procedure may further comprise communicating with a register to confirm that the device ID is associated with the worker ID 108. The safety device may further comprise a mean to input the worker ID or to scan the said worker ID. When such a test is successful 109, it typically confirms that user is using the associated safety device. Such association may be used to access information about either the device or the worker, such as the medical records to be used in the event of an emergency. As such, if the device is not associated with an authorized worker, the test procedure fails 110.

Still referring to FIG. 1A, in one of the embodiments, the safety device comprises a portable power source, such as a battery. As the portable power source must last at least one full work shift, the test procedure may comprise checking the current charge level of the portable power source 112 and comparing the current charge level with a predetermined minimum charge level. If the current charge level is lower than the predetermined minimum charge level, the test procedure fails 110.

In a preferred embodiment, the output user-interface may be the cap lamp light. When the safety device detects being disconnected from the charger, the cap lamp light may be configured to continuously flash or blink, effectively disabling the main function of the device which is an integral part of the person's everyday work. The flashing or blinking shall stop when the test procedure is successful 109. In the event where at least one test fails, the cap lamp light shall continue to flash or blink 110. The continued flashing or blinking shall alert a user, typically a miner, that the device is faulty. In the event where the user would not have noticed the blinking within the safe zone, the user or others shall be quickly aware of the malfunction when entering a darker area as the stroboscope effect shall be noticeable.

Figure 1B:
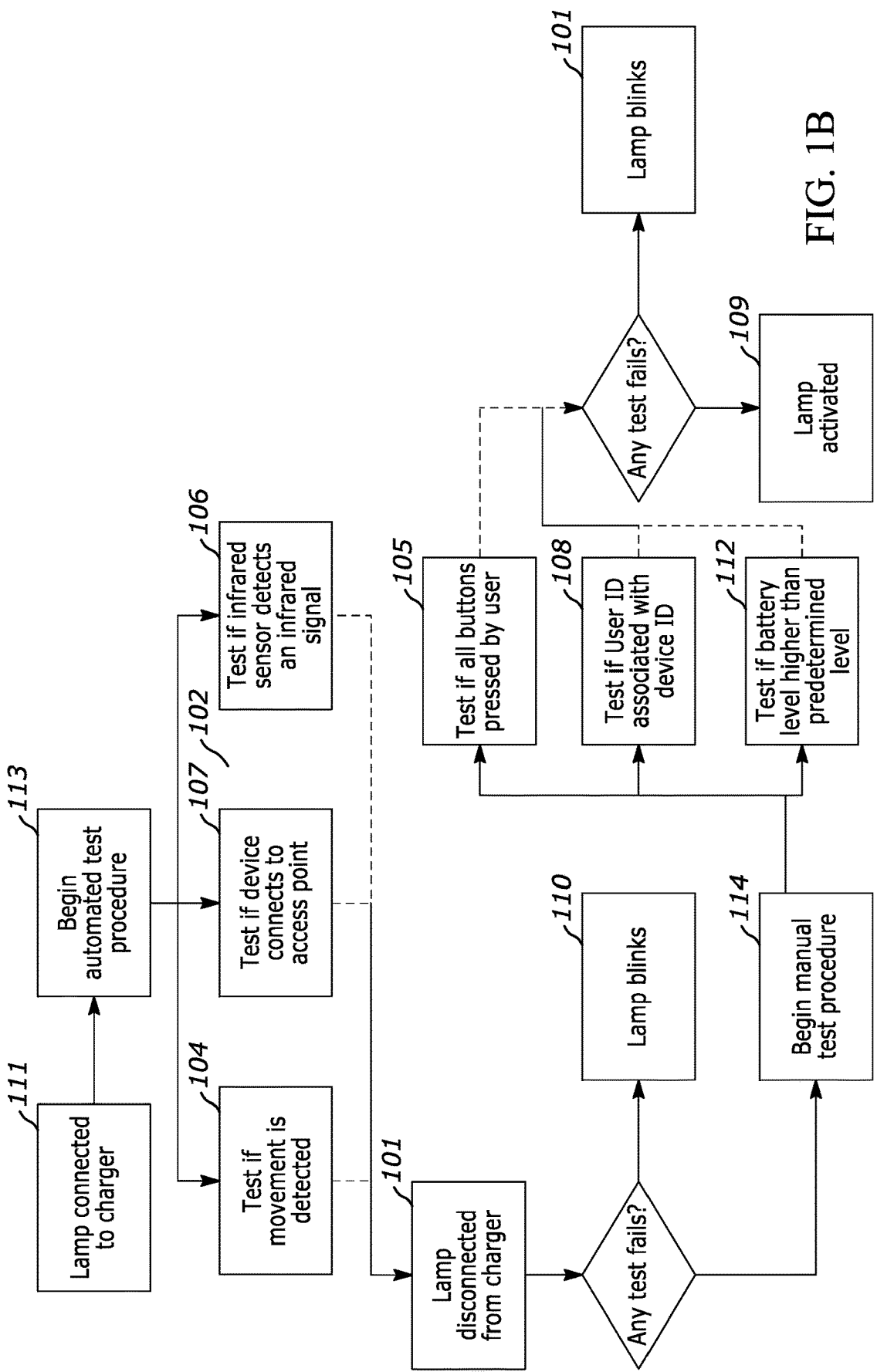
FIG. 1B is a workflow diagram of a method to prevent use of faulty exemplary safety device integrated into a cap lamp when the safety device is connected to a charging device in accordance with the present invention.

Now referring to FIG. 1B, in another embodiment, the method to prevent use of faulty exemplary safety device integrated into a cap lamp being connected to a charging device is shown. In such an embodiment, one or more automated test procedures or test procedure not requiring human intervention may be performed on the safety device 113 while the device is connected to the charger 111. The execution of the one or more automated test 113 procedures may be triggered by the safety device being connected to the charger or may be performed at a predetermined schedule or frequency. The automated test procedures 113 may comprise testing if movement is detected 104, testing if device connects to access point of a wireless network 107 or test if an infrared sensor detects an infrared signal 106. One skilled in the art shall understand that any other type of automated test procedures adapted to a specific safety device may be used without departing from the scope of the present invention.

Understandably, any other method for triggering the execution of the automated test procedure may be used without departing from the scope of the present invention. As an example, a button may be pressed to start such procedure or a remote command may be sent to the device over a network to start the procedure.

If any of the automated test procedures fails, the output user-interface is activated 110 upon failure or at the time where the safety device is disconnected from the charger device. Thus, a user may be alerted of a faulty device before even disconnecting the safety device from the charging device or at the time of disconnecting the faulty safety device. Such procedure aims at reducing the duration of the execution of the automated test procedures and thus increasing efficiency of the user.

Still referring to FIG. 1B, if the safety device is activated, 109, the user may perform one or more manual test procedures 114, such as but not limited to, testing if all the buttons of the safety device have been pressed 105, testing if the user Id is associated with the device ID 108 or testing if battery charge level is higher than a predetermined level 112. Again, one skilled in the art shall understand that any other type of manual test procedures or variations of the above mentioned manual test procedures adapted to a specific safety device may be used without departing from the scope of the present invention.

In an embodiment where the output user-interface is activated at the time when the safety device is disconnected from the charger device, the safety device may comprise a memory unit adapted to log or stored the failure of the one or more automated test procedures. When disconnected from the charger, if the safety device reads a failure event from the memory unit, the output user-interface is activated.

In yet another embodiment, the manual test procedure may also be performed while the safety device 103 is connected to the charger device.

Understandably, any other types of output user-interface shall be used, such as but not limited to a speaker or beeping device, a graphical display, a light or set of lights, a vibrating mean, a notification to other users, etc. Also, any other types of input user-interface shall be used, such as but not limited to button, touch screen, keyboard, mouse or any other man to machine interface.

Figure 2:
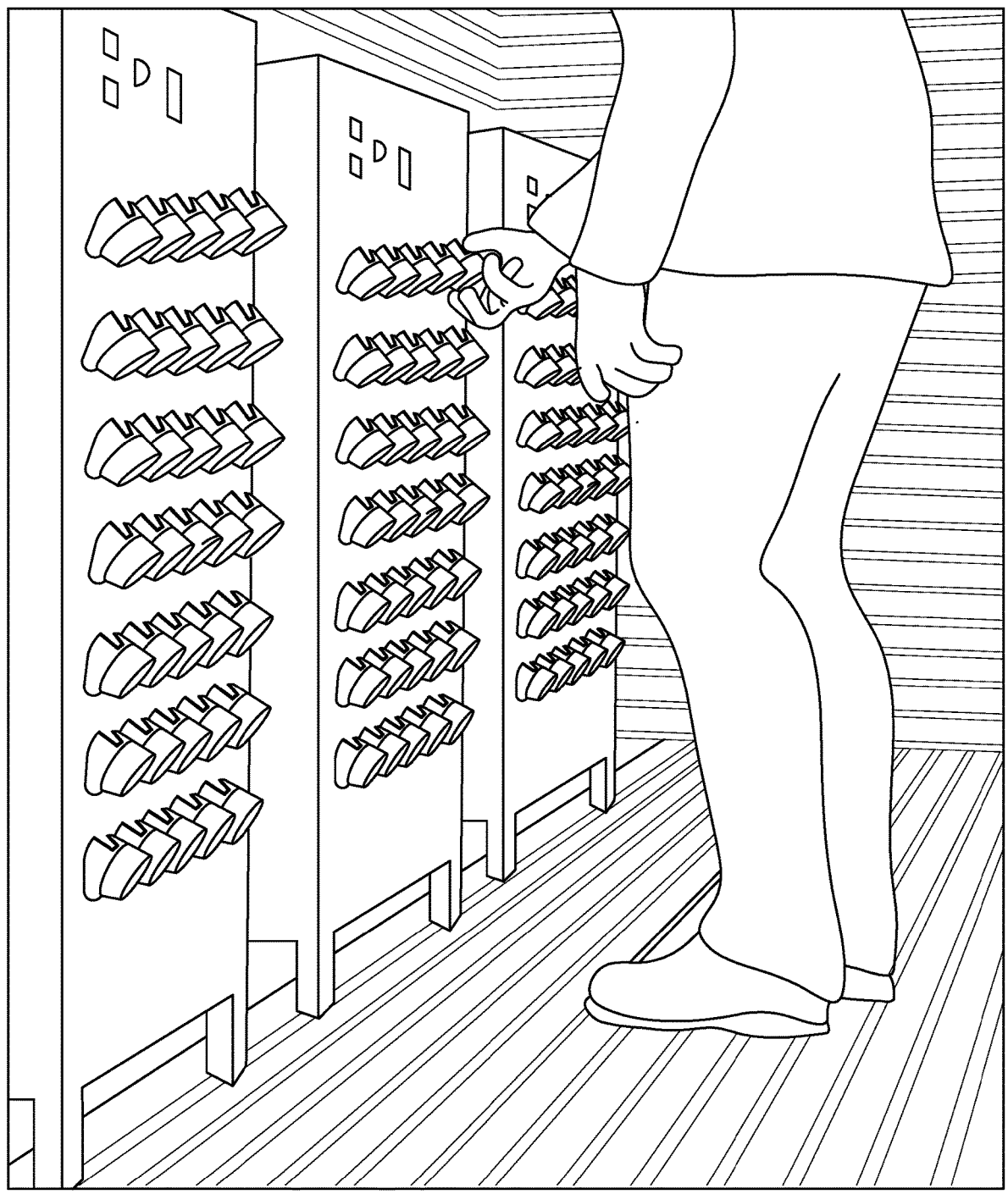
FIG. 2 is an illustration of a rack of exemplary safety devices integrated into cap lamps being charged in accordance with the present invention.

Now referring to FIG. 2, a rack comprising a plurality of exemplary safety devices integrated into cap lamps is shown. As the user disconnects the cap lamp from the charger, the light of the cap lamp may start blinking to warn the user that an automated and/or manual testing procedure shall be executed prior to using the safety device.

Figure 3:
FIG. 3 is an illustration of an exemplary safety devices integrated into cap lamps on which a manual test procedure is being executed in accordance with the present invention.

Now referring to FIG. 3, a manual testing procedure executed by the user while the cap lamp is blinking is shown. In such an embodiment, the cap lamp comprises buttons acting as input user-interface. In such an embodiment, the user presses the buttons to detect possible failure of the said buttons.

Figure 4:
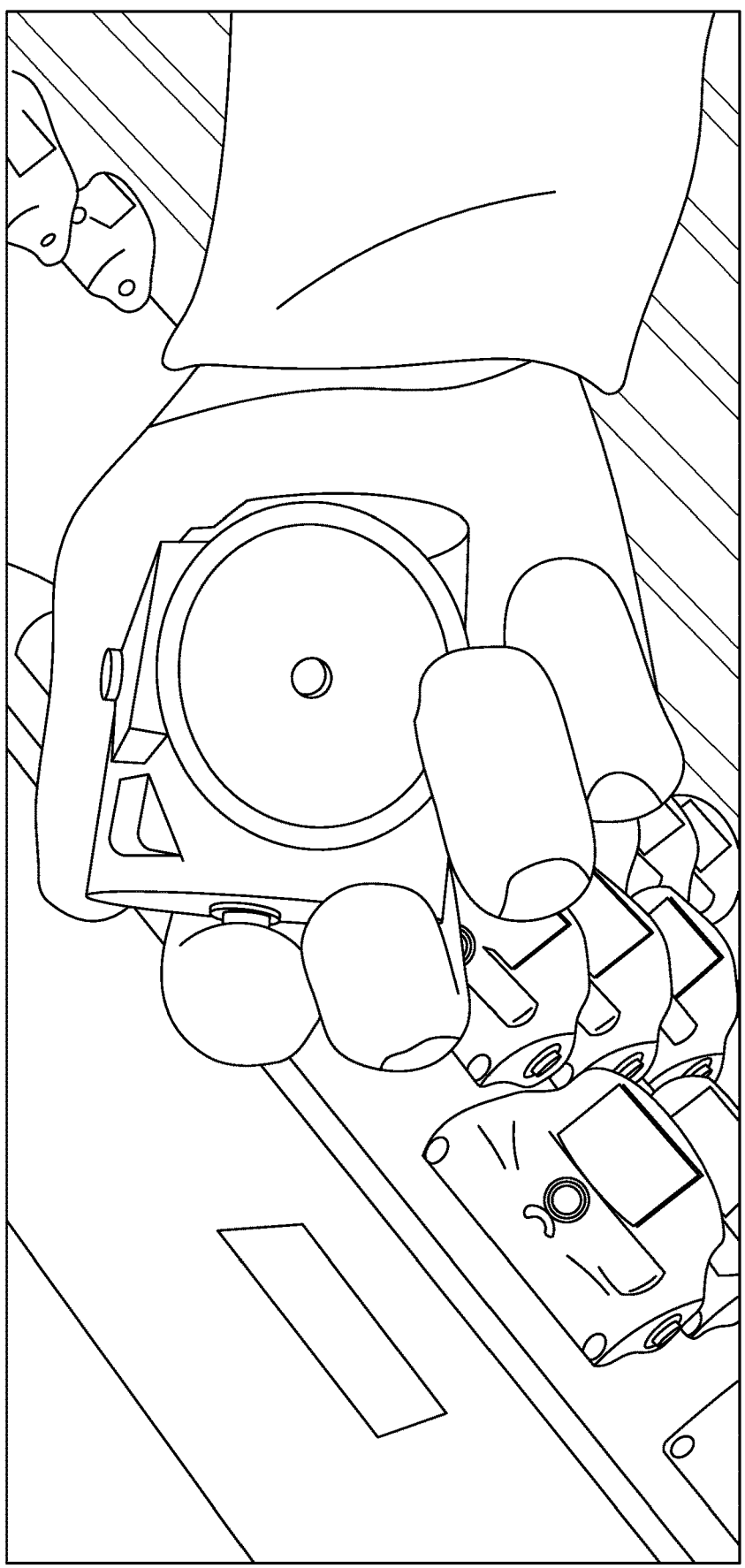
FIG. 4 is an illustration of an exemplary safety devices integrated into cap lamps on which a test procedure has succeeded in accordance with the present invention.

Now referring to FIG. 4, the cap lamp being ready to be used is shown. In such an embodiment, the output user-interface is embodied as the lamp light. If the lamp light stops flashing, it shows that the test procedure successfully completed and that the safety device is ready to be used. In the event where the test procedure would fail, the cap lamp would continue flashing or blinking (not shown in FIG. 4).

In another embodiment, the cap lamp may further comprise an indicative light (for example a green light) which is either turned on or turned off during the test. When the test procedure has been completed, the indicative light is either turned off or turned on to indicate the end of the test procedure.

Figure 5:
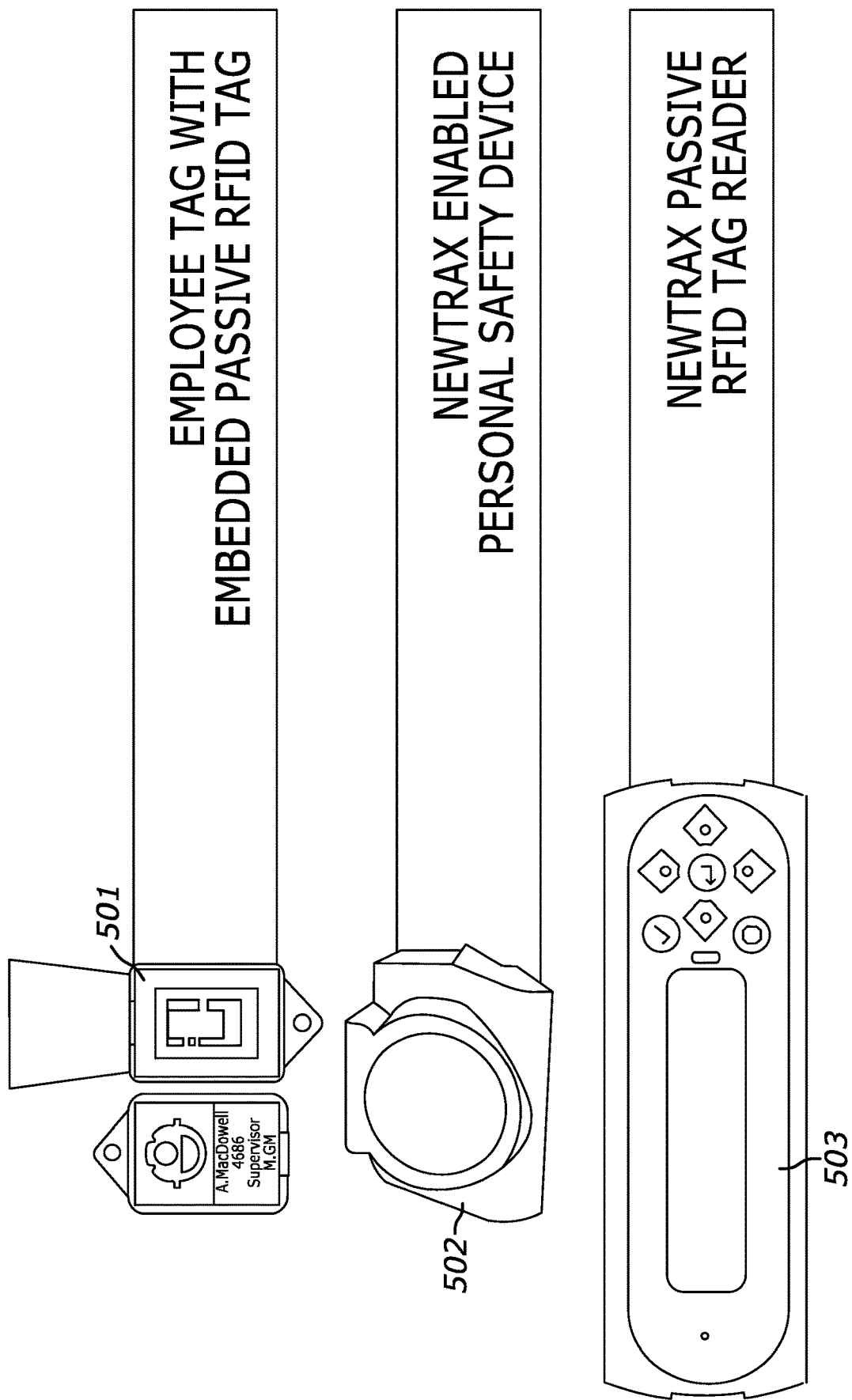
FIG. 5 is an illustration of exemplary components of a system for associating a safety device with a user in accordance with the present invention.

Now referring to FIG. 5, exemplary components of a system for associating a safety device with a user are shown. The components comprise an identification means or tag 501 having a unique identifier associated with an employee or a user. In a preferred embodiment, the identification means is a card or tag comprising a RFID or NFC tag.

The components further comprise a personal safety device 502, such as but not limited to a cap lamp, and a tag reader 503, such as a passive RFID or NFC tag reader. The safety device 502 comprises a unique identifier embedded in a tag such as a passive RFID tag.

Figure 6A:
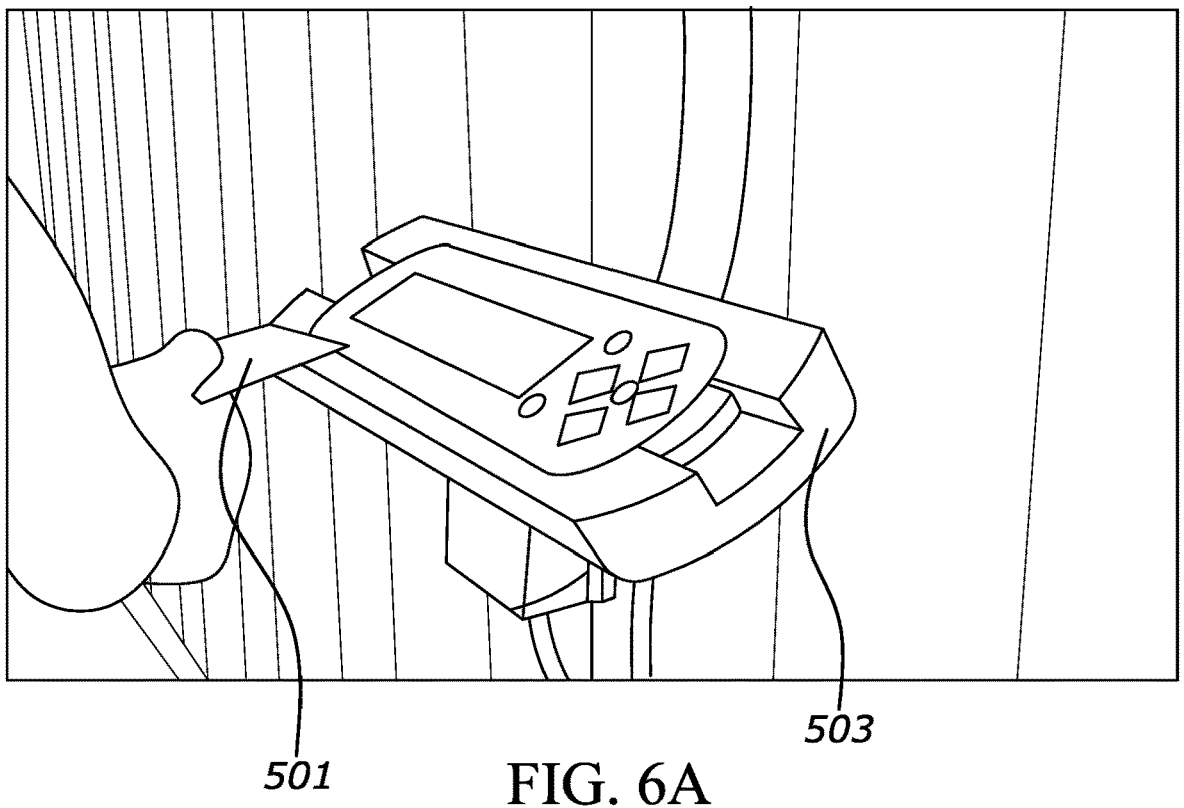
FIGS. 6A-6D illustrate an exemplary system and method for associating a safety device with a user in accordance with the present invention.
Figure 6B:
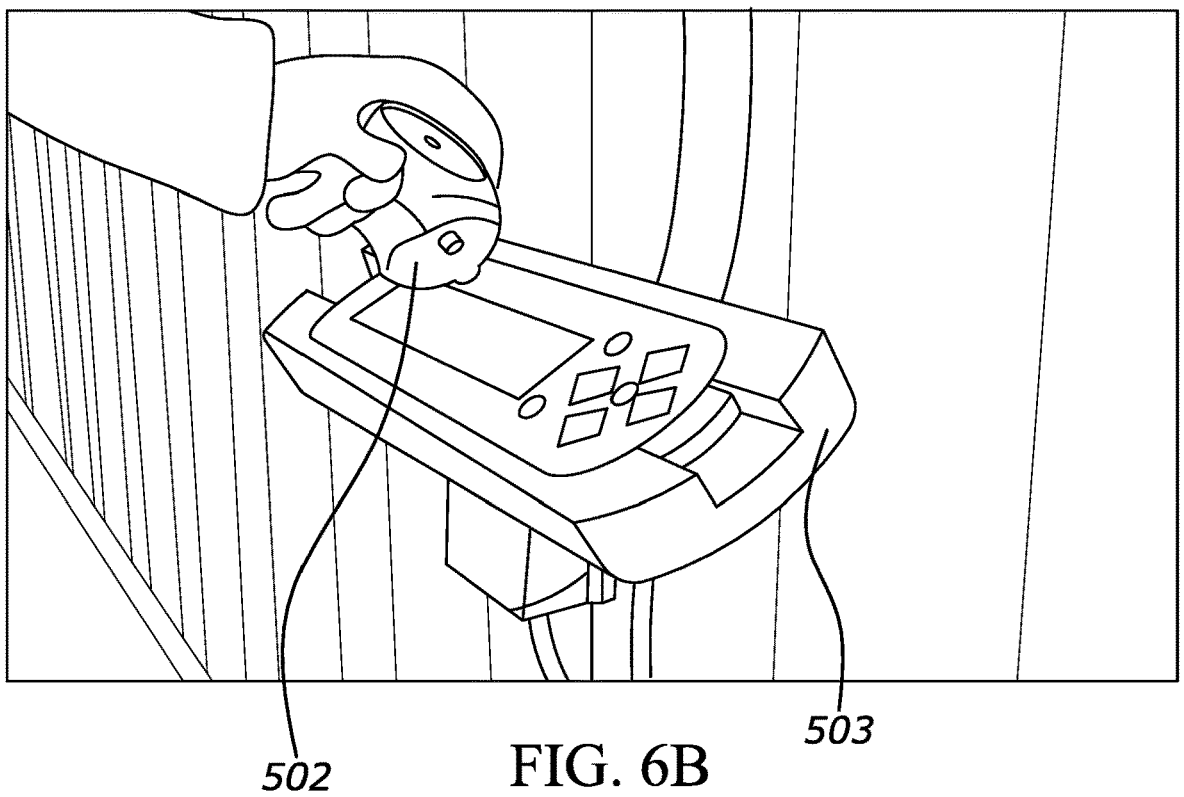
Figure 6C:
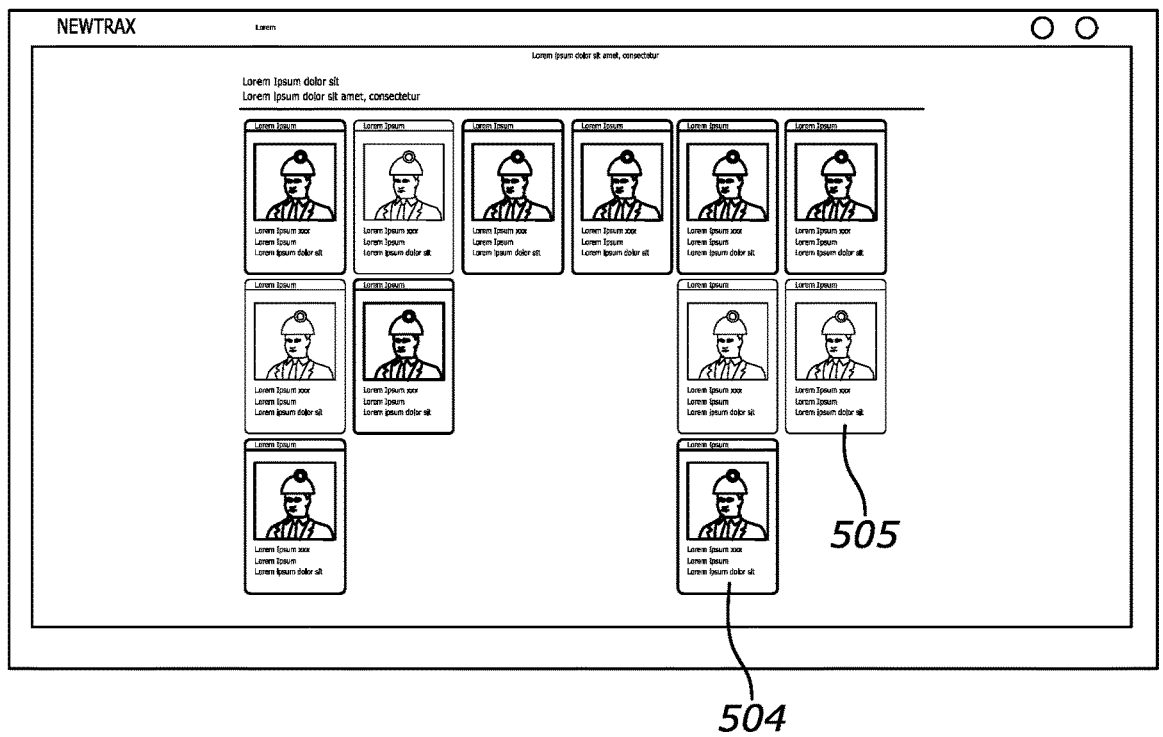
Figure 6D:
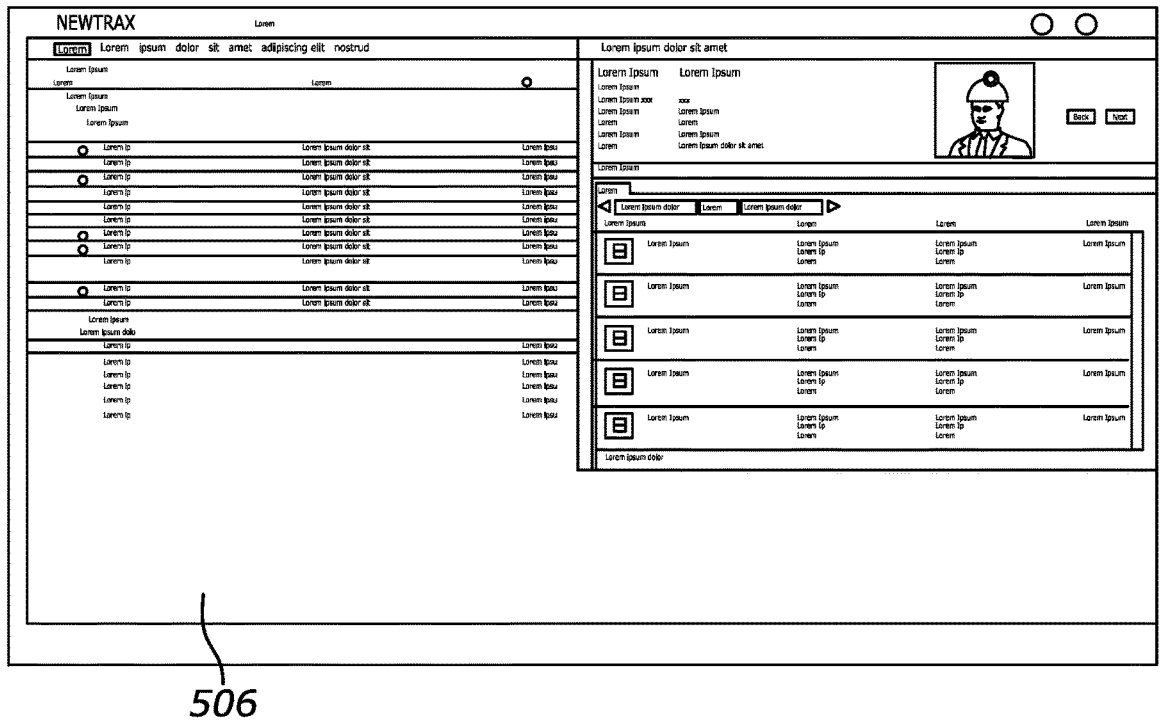

Now referring to FIGS. 6A to 6D, an exemplary system and method for associating a safety device with a user is shown. Such method for associating the safety device may be used to test if the user identifier ID is associated with the safety device 502 unique identifier 108. The method comprises a user or employee approaching the identification means 501 close to the tag reader 503 (see FIG. 6A). The tag reader 503 is configured to read the unique identifier and communicate the read unique identifier to a server. The server is configured to associate the received identifier with an authorized user profile comprising the same unique identifier. The server is further configured to activate the associated user profile. The FIG. 6C shows an exemplary graphical interface showing the active profiles 504 and inactive profiles 505.

The method further comprises approaching a safety device 501 comprising a unique identifier or tag close to the tag reader 503. The tag reader 503 is configured to read the unique identifier of the safety device 502 and communicate the read unique identifier of the safety device 502 to the server along with the unique identifier of the identification means 501. The server is further configured to associate the unique identifier of the safety device 502 with the active authorized user profile.

Understandably, in other embodiments, other methods for identifying the user and the safety device may be used without departing from the scope of the present invention. As an example, a user may select his name from a list of allowed users, then selects the device ID in used from a list of allowed device IDs. Upon selection of both the user and the device, the association of the user ID to the device ID is done is processed by a server.

The system for associating a safety device with a user is further adapted to allow periodic check-ins of the user during work shifts. The system is further configured to receive request for emergency assistance from the safety device 502 or to generate automatic alarms upon lack of movement of a worker or user.

Figure 7:
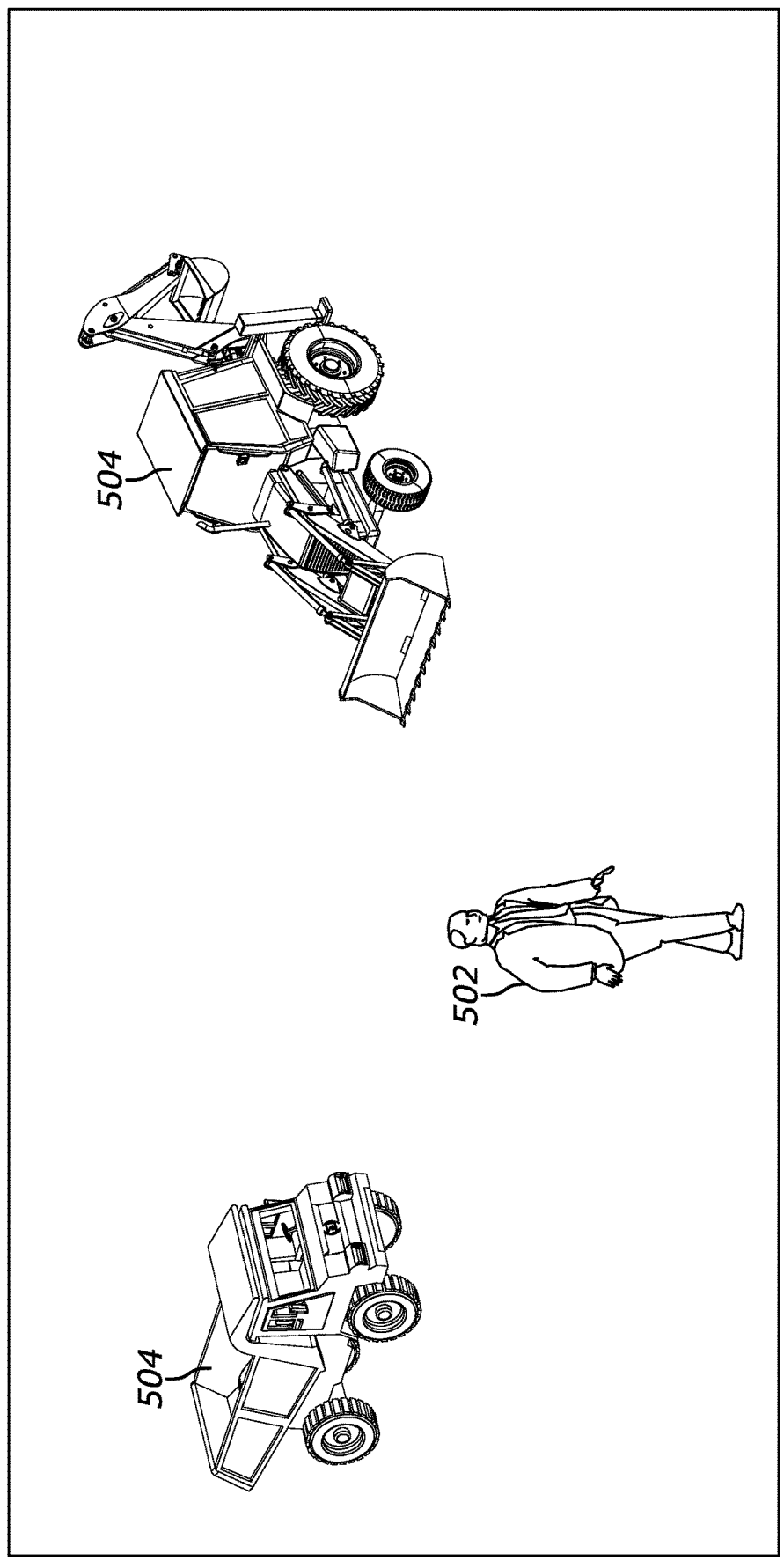
FIG. 7 is an illustration of a wireless ad hoc network of a safety device with vehicle devices in accordance with the present invention.
Figure 8:
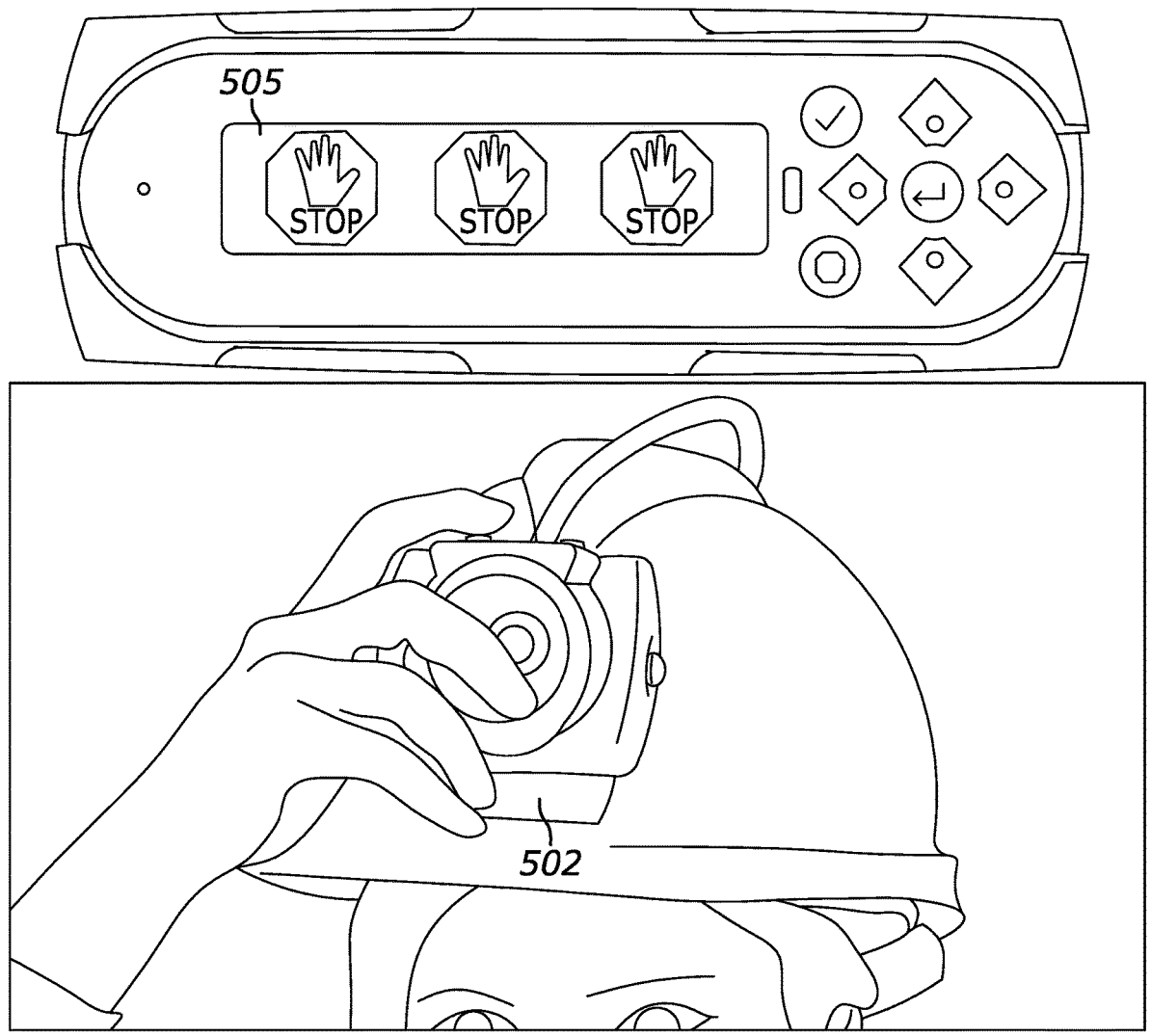
FIG. 8 is an illustration of a button of an exemplary cap lamp safety device used to send an emergency stop signal to vehicle operators on demand in accordance with the present invention.

Now referring to FIG. 7, an exemplary ad-hoc network of a safety device 502 in communication with vehicle devices 504 is shown. Now referring to FIG. 8, an exemplary cap lamp safety device 502 used to send an emergency stop signal to an output user interface 505 of a vehicle is shown. As such ad-hoc networks generally aims at increasing the security of the workers and the vehicle operators, the method to prevent use of faulty exemplary safety device detects that communication may be established with a wireless network thus confirming that the antenna is in a working state and that emergency assistance may be efficiently performed. Furthermore, as the safety device 502 must be at least in acceptable working condition during the duration of the presence in an underground mine, the test procedure for checking the portable power source charge level aims at ensuring that safety device 502 will be continuously sending presence of the worker in certain area.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

What is claimed is:

1. A cap lamp, the cap lamp comprising:
   a light;
   a processor, the processor being configured to:
      detect that the cap lamp is disconnected from a charger;
      upon detecting that the cap lamp is disconnected from the charger, cause the light to start blinking;
      perform a test procedure on the cap lamp;
      upon determining that the test procedure has been successfully performed, cause the light to stop blinking.

2. The cap lamp of claim 1, wherein the test procedure comprises at least one test, and wherein the processor is configured to cause the light to stop blinking upon determining that the at least one test has been successfully performed.

3. The cap lamp of claim 2, wherein the at least one test comprises at least one manual test.

4. The cap lamp of claim 3, wherein the cap lamp further comprises a plurality of buttons, and wherein the at least one manual test comprises detecting whether a user has pressed each of the plurality of buttons.

5. The cap lamp of claim 3, wherein the cap lamp further comprises a plurality of buttons, and wherein the at least one manual test comprises detecting whether a user has pressed each of the plurality of buttons in a predetermined sequence.

6. The cap lamp of claim 2, wherein the at least one test comprises at least one automated test.

7. The cap lamp of claim 6, wherein the cap lamp further comprises a battery, and wherein the at least one automated test comprises determining whether a current charge level of the battery is greater than a predetermined minimum charge level.

8. The cap lamp of claim 6, wherein the cap lamp further comprises an inertial sensor, and wherein the at least one automated test comprises determining whether movement is detected by the inertial sensor.

9. The cap lamp of claim 1, wherein the test procedure comprises a plurality of tests, and wherein the processor is configured to cause the light to stop blinking upon determining that each of the plurality of tests has been successfully performed.

10. The cap lamp of claim 1, wherein the processor is further configured to, upon determining that the test procedure has not been successfully performed, cause the light to continue blinking.

11. A method in a cap lamp, the cap lamp comprising a light, the method comprising:
   detecting that the cap lamp is disconnected from a charger;
   upon detecting that the cap lamp is disconnected from the charger, causing the light to start blinking;
   performing a test procedure on the cap lamp;
   upon determining that the test procedure has been successfully performed, causing the light to stop blinking.

12. The method of claim 11, wherein the test procedure comprises at least one test, and wherein determining that the test procedure has been successfully performed comprises determining that the at least one test has been successfully performed.

13. The method of claim 12, wherein the at least one test comprises at least one manual test.

14. The method of claim 13, wherein the cap lamp further comprises a plurality of buttons, and wherein the at least one manual test comprises detecting whether a user has pressed each of the plurality of buttons.

15. The method of claim 13, wherein the cap lamp further comprises a plurality of buttons, and wherein the at least one manual test comprises detecting whether a user has pressed each of the plurality of buttons in a predetermined sequence.

16. The method of claim 12, wherein the at least one test comprises at least one automated test.

17. The method of claim 16, wherein the cap lamp further comprises a battery, and wherein the at least one automated test comprises determining whether a current charge level of the battery is greater than a predetermined minimum charge level.

18. The method of claim 16, wherein the cap lamp further comprises an inertial sensor, and wherein the at least one automated test comprises determining whether movement is detected by the inertial sensor.

19. The method of claim 11, wherein the test procedure comprises a plurality of tests, and wherein determining that the test procedure has been successfully performed comprises determining that each of the plurality of tests has been successfully performed.

20. The method of claim 11, further comprising, upon determining that the test procedure has not been successfully performed, causing the light to continue blinking.

* * * * *